UNITED STATES PATENT OFFICE.

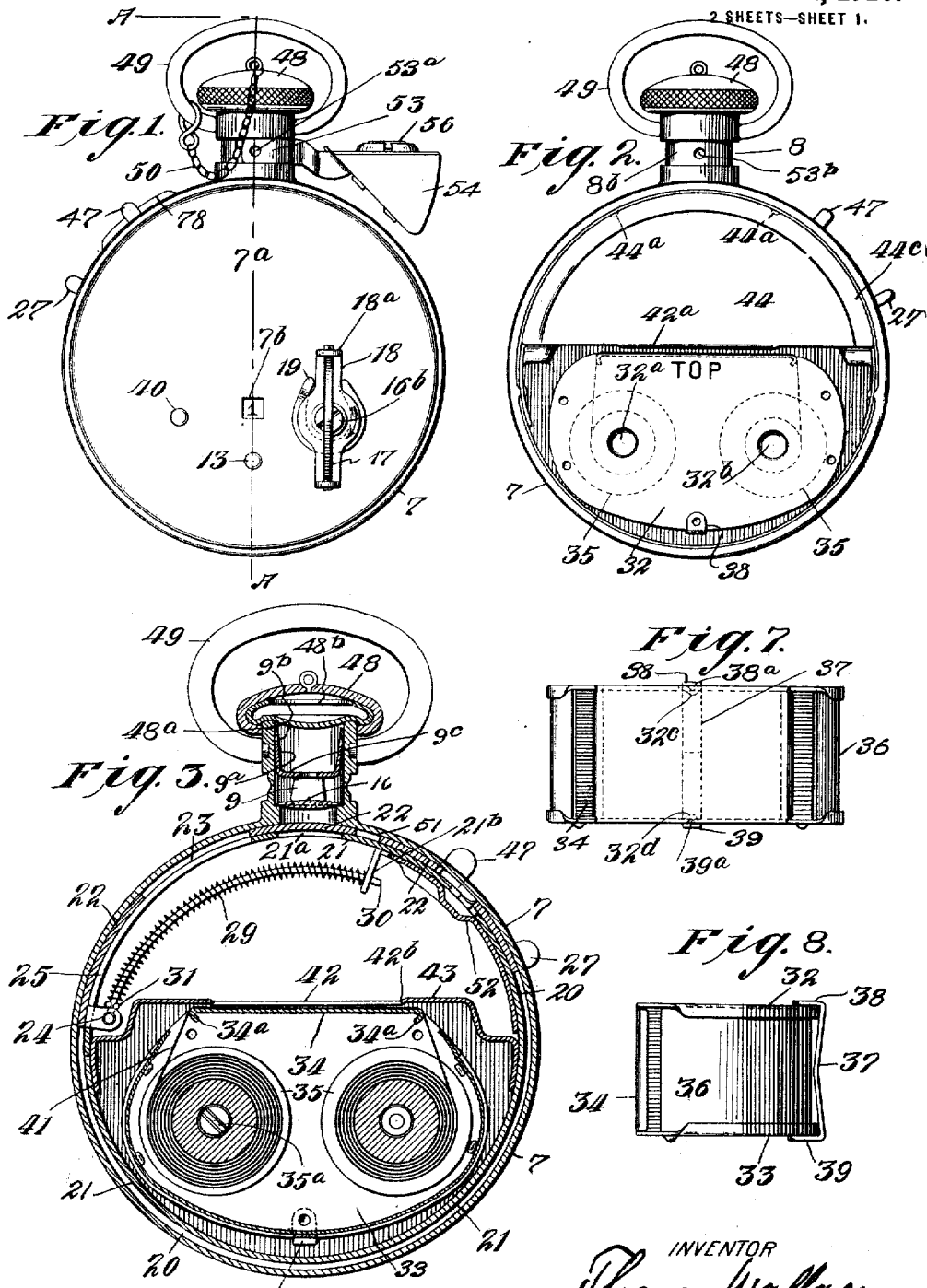

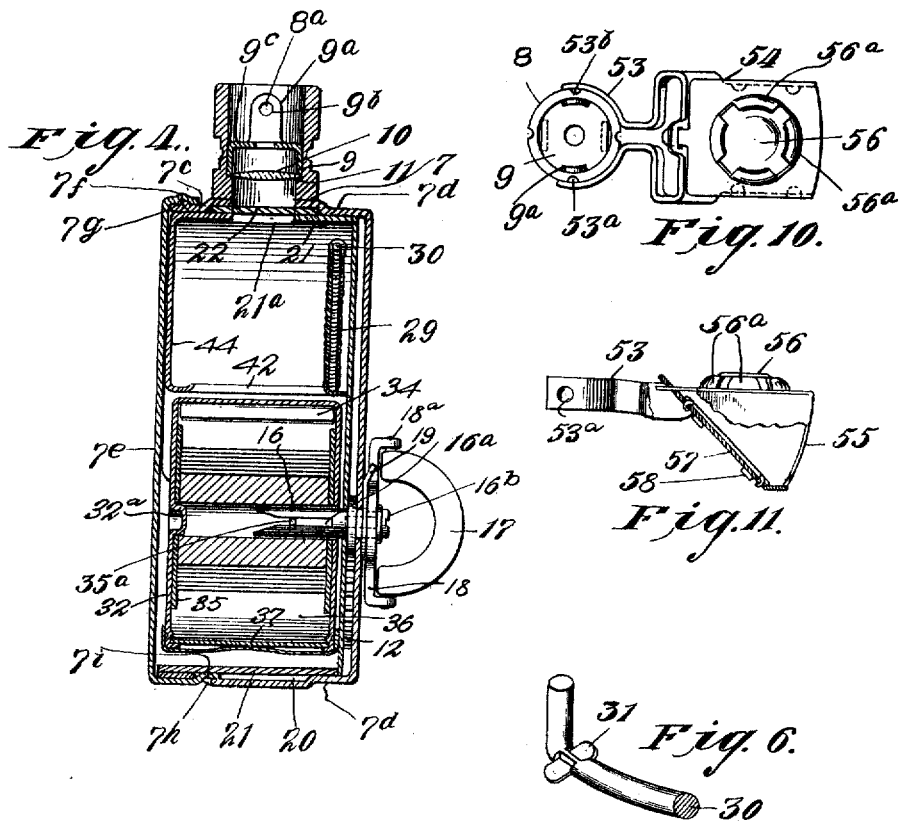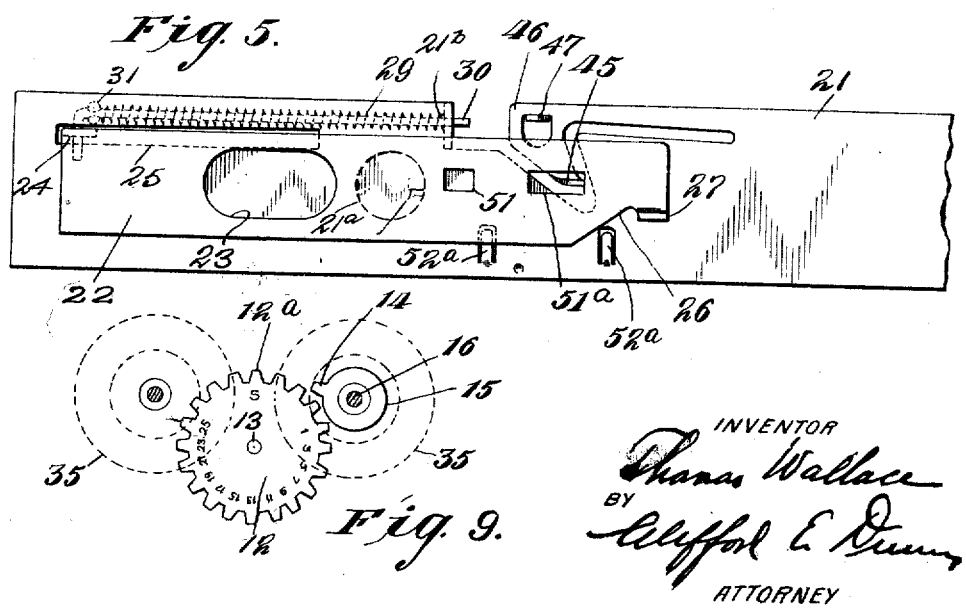

THOMAS WALLACE, OF BROOKLYN, NEW YORK.

CAMERA-SHUTTER AND OPERATING MECHANISM THEREFOR.

1,361,939. Specification of Letters Patent. Patented Dec. 14, 1920.

Application filed July 5, 1918. Serial No. 243,272.

*To all whom it may concern:*

Be it known that I, THOMAS WALLACE, a citizen of the United States, residing at Brooklyn, in the county of Kings and State of New York, have invented certain new and useful Improvements in Camera-Shutters and Operating Mechanism Therefor, of which the following is a specification.

The present invention relates generally to the art of photography and is more especially directed to improvements in the construction of a camera of the general type illustrated and described in United States Letters Patent No. 769,319, issued September 6, 1904 to Magnus Niell.

The object of the present invention is to produce a camera of the so-called watchcase or vest pocket type which may be economically manufactured and assembled, and wherein the number of operating parts is decreased or lessened, thereby producing a much more durable structure than is at present obtainable.

A further object of my invention is to provide a camera possessing the aforesaid characteristics wherein the coöperating parts may be produced by simple manufacturing operations so that the devices may be expeditiously made and put together, numerous individual parts heretofore employed in the specific type referred to having been dispensed with, the equivalents of these elements being formed integral with other components of the camera structure.

My invention also comprehends a new and novel shutter and means for operating the same, together with other details aiming to simplify the construction and production of cameras of the so-called watchcase or vest pocket type, which will become evident as I proceed with the description of my invention.

I have elected to describe one embodiment of my invention in order to afford a clear and comprehensive understanding of the construction and function thereof, but I, of course, would have it understood that I do not limit myself to the specific details set forth, reserving unto myself the full range of equivalents, both in structure and uses, to which I may be entitled under my invention in its broadest aspect.

I shall now proceed to describe my invention with reference to the accompanying drawings, and then point out the essential elements of novelty therein in the appended claims.

Figure 1 is a bottom plan view of a photographic camera embodying my invention.

Fig. 2 is a top plan view of the camera with the cover of the casing removed to expose the film holder and the guard.

Fig. 3 is a sectional view showing the relative positions of the shutter operating mechanism, film holder and coöperating parts disposed within the camera casing.

Fig. 4 is a sectional elevation taken on the line A—A of Fig. 1.

Fig. 5 is an enlarged plan view of the shutter, its operating mechanism and coöperating parts, in assembled relation prior to being positioned in the camera.

Fig. 6 is a detail of a portion of the shutter operating mechanism.

Fig. 7 is a front view in elevation of the film holder.

Fig. 8 is a side elevation of the film holder.

Fig. 9 is an enlarged detail view of the film operating and exposure recording mechanism; and Figs. 10 and 11 are respectively, a top plan view and a side elevation, partly in section, of an improved form of finder which I employ in connection with my camera.

Referring now to the drawings in detail, in which like characters of reference are employed to designate similar parts throughout the several views, 7 represents the casing which is preferably made of metal and of an annular shape or configuration, although obviously any other suitable form or material may be employed for the purpose. A casing of the general type illustrated is preferred as the general object of a camera of this type is to simulate a watchcase and to carry out this effect I have found it desirable to provide the case with the equivalent of a watchcase stem, indicated at 8, within which the lens holder 9 embodying a diaphragm $9^c$ and having a lens 10 seated therein is positioned. As will be noted from Figs. 3 and 4, the stem 8 is provided with an interiorly formed shoulder 11 providing a seat for the lens holder 9, the latter being held in place by the frictional engagement of the ears $9^a$ with the detents or burs formed upon the interior of the same, as indicated at $8^a$, these detents or burs seating themselves in the apertures $9^b$ of the ears $9^a$.

One side or face of the camera casing 7 is formed integral with the side wall thereof and constitutes what may be termed the bottom 7ª, for the purpose of this description. This bottom portion of the casing is provided with a preferably rectangular orifice 7ᵇ through which the indicia on the exposure indicating wheel 12 is rendered visible, this wheel 12 being mounted on the stud 13, the periphery of said wheel being provided with the teeth 12ª spaced for engagement by the projection 14 on the disk 15 fixed to the stud 16. The spindle 16, as will be observed from Fig. 4, is formed with an elongated slot 16ª to engage the film spool which is adapted for registration therewith and which will be hereinafter more fully described, so that the spool may be rotated by turning the handle 17 in the direction of the arrow, shown in Fig. 1. This handle is pivoted in the upturned ears 18ª of the plate 18, the latter being rigidly fastened to the spindle 16 by the screw 16ᵇ and being held under tension relative to the exterior of the bottom of the casing by the spring 19 which is punched out of a single blank of material and placed in position between the underside of the plate 18 and the exterior of the bottom of the casing 7ª, as clearly shown in Figs. 1 and 4.

Positioned within the casing 7, the portion intermediate of its edges being spaced from the inner surface of the casing, as shown at 20, by the formation of the shoulders 7ᶜ and 7ᵈ, is a strip of material, preferably of resilient spring metal 21. This strip of material is of the requisite length and width to form a continuous inner wall or lining for the casing and is held therein by frictional engagement with the contracted portions of the wall resulting from the formation of the shoulders 7ᶜ and 7ᵈ.

Disposed between the strip 21 and inner wall of the casing 7, and movable within the space 20, is a shutter 22 having the elongated exposure aperture 23 adapted to register with the lens opening in the stem 8 and the annular orifice 21ª in the strip 21, the orifice 21ª being in alinement with the lens opening. The shutter conforms to the contour of the casing and at one end thereof, on the lower edge, is provided with a right angularly directed projection or tongue 24 which is adapted to ride within the elongated slot 25 in the strip 21. The other end of the shutter is cut away, as indicated at 26, and an outwardly directed finger piece 27 formed thereon which projects through a slot adjacent thereto in the wall of the casing 7. Obviously, the disposition of the shutter parts just described will serve to maintain the shutter in operative position, the coöperating slots and projections forming positive guiding means.

The shutter 22 is functioned to effect an exposure of the film by the expansion of the coil spring 29 mounted on the curved rod 30, one end of which is turned upwardly and seated in the tongue or projection 24, the body of the rod being freely movable within the bearing provided in the inwardly directed projection 21ᵇ formed integral with the strip 21. This projection also forms a seat for one end of the spring 29, as shown in Fig. 3, the other end of the spring abutting against the stop 31 formed integrally with the rod 30 by a swaging or similar operation.

The film magazine or holder forming a part of my present invention comprises the top and bottom members 32 and 33, and the front face or plate 34 formed integral therewith, the top member having the annular depressions 32ª and 32ᵇ provided therein, and forming studs adapted for seating in the openings in the film spools 35, shown in dotted lines in Fig. 2. The bottom member of the film magazine is apertured in line with these depressions for the reception of the spindle 16, so that the faces of the elongated slot 16ª may engage the cross pin 35ª in the film spool. It will be noted that with the construction of the film magazine or holder as just described, the film spools may be expeditiously inserted therein by reason of the resiliency of the metal, the free edges of the top and bottom members 32 and 33 being held together so that the undersurfaces thereof abut upon the mask paper 36, by means of the spring 37 having the inturned ends 38 and 39 which are provided with detents 38ª and 39ª to register with the complemental depressions 32ᶜ and 32ᵇ on the top and bottom members 32 and 33, respectively, of the film magazine.

When it is desired to use the camera, the film magazine is placed in position, as shown in Figs. 2, 3 and 4, one of the apertures in the bottom member 33 thereof registering with the stud 40, while the spindle 16 passes through the other into engagement with the film spool, as previously explained. The film, indicated at 41, is fed over the plate or front face 34 of the film magazine, the edges of which are beveled, as shown at 34ª, to eliminate the possibility of binding or jamming of the film when being fed thereover. This plate, it will be noted, is in registry with the exposure opening 42 in the partition 43 extending transversely of the casing 7, having a substantially semicircular top member 44 formed integral therewith and adapted to provide a light-proof closure for that portion of the casing which contains the actuating spring and other shutter functioning parts, as clearly shown in Fig. 2.

I have found it desirable to form the upper and lower edges of the exposure opening 42 with ribs 42ª and 42ᵇ to insure proper feeding of the film past the same as I have found in many instances that were these ribs omitted, the film would have a tendency to bind or jam on the edges of this opening. This partition member comprising the partition 43 and the closure portion 44 is held in position by frictional engagement with the inner wall of the casing 7 and the complemental depressions and detents formed in the rim of the wall and the edge of the closure 44, as shown at 44ª. In order to insure the proper registry of the film surface to be exposed with the exposure opening 42, it will be noted that the partition 43 is slightly higher than the wall of the casing 7, the portion of the closure 44 adjacent to the edge thereof being beveled, as indicated at 44ᶜ, to bring it into line with the upper edge of the casing 7, as shown in Fig. 2.

To set the shutter for an instantaneous exposure, the shutter is drawn back against the tension of the spring 29 by means of the finger piece 27 until the projection or stop 45 on the yielding tongue 46 formed by cutting out portions of the strip 21, as clearly shown in Fig. 5, engages with the exposure aperture 23. It will be noted that the yielding tongue 46 has struck up therefrom a right angularly disposed finger piece 47 which projects through a slot provided in the casing 7, as shown in Fig. 3. To effect the exposure of the film, the cap 48 fastened to the ring 49 by means of a chain 50, or the like, is removed from engagement with the stem 8 and the finger piece 47 then depressed or moved inwardly. This effects the disengagement of the projection or stop 45 from the exposure aperture 23 and permits the shutter to function under the expansion of the spring 29 in the usual manner. To effect a time exposure, a slot or opening 51 is punched in the shutter 22, this slot being adapted to be engaged by the stop or projection 45 to aline the exposure aperture 23 in the shutter with the lens opening. The cap 48 is then removed from the stem 8 and at the expiration of the required time the shutter is released in the same manner as that explained in connection with the instantaneous exposure operation. To guard against accidental actuation of the shutter when the camera is being carried, I provide an elongated slot 51ª spaced from the slot 51 in the shutter 22 which is adapted to engage the projection 45 on the tongue 46, as shown in Fig. 5.

In order to protect the spring operated tongue 46 and the coöperating parts, and render the camera absolutely light-proof, I have found it expedient to provide a plate 52 which is positioned within the casing, as shown in Fig. 3, this plate being of a shape to allow free actuation of the parts covered thereby and being held in rigid engagement with the abutting surface of the strip of material 21 by means of the ears 52ª formed integral with the strip 21 and pressed down into engagement with the upper edge and inner surface of said plate 52.

The stem 8, as will be observed from the drawings, has an annular groove or recess 8ᵇ formed therein to receive the spring arms or fingers 53 of the finder 54, these arms being held in positive engagement with the stem 8 by the registration of the detents 53ª with the depression 53ᵇ in the stem. The finder consists of the usual ground glass 55, the lens 56, and mirror or reflecting medium 57, mounted in an inclined plane, the top, sides and front face of the finder being formed integral with each other, while the reflector or mirror supporting the bottom member is formed integral with the spring arms 53, as shown in Fig. 11, and is secured or fastened to the remaining portion of the finder by the formation of the ears 58 pressed into engagement therewith. The lens 56 is held in the top of the finder by the struck up fingers 56ª shown in Figs. 10 and 11, so that, as will be seen, the finder lends itself admirably to economical production.

To open the camera, the complemental parts 7ᶠ and 7ᵍ may be disengaged by applying pressure to the thumb piece 7ʲ projecting from the rim of the closure 7ᵉ, as shown in Fig. 1.

The cover or closure 7ᵉ is frictionally held in position by the engagement of the complemental dentents 7ᶠ and 7ᵍ on the rim of the casing 7 and closure, respectively, the proper positioning of the closure on the rim being insured by the provision of the tongue 7ʰ which must be inserted in the slot 7ⁱ in the casing before the cover or closure 7ᵉ can be firmly seated.

From the foregoing description, it will be noted that I have produced a simple and compact camera of the so-called pocket or watchcase type, the operating mechanism being absolutely positive in functioning and fully protected against injury. Furthermore, the arrangement of the parts and the method of positioning the closure 7ᵉ and locking it in place, together with the formation of the member 48ᵇ positioned within the cap 48 and provided with a swelled portion 48ª forming a seal for the lens opening in the stem 8, makes an absolutely light-proof device.

While I have described my invention with reference to the specific details herein illustrated, it is obvious that changes may be made thereto without departing from the spirit and scope of my invention.

Having thus described my invention what I claim as new and desire to secure by Letters Patent of the United States is:

1. In a photographic camera having a circular casing, a lens holder projecting from the periphery of the casing, a film holder mounted within the casing, and means for feeding the film positioned exteriorly of the casing, the combination of a spring actuated shutter, and means for setting the shutter at instantaneous and time exposure positions, said means including a yieldable member formed integrally with the interior of the casing and provided with a finger piece projecting through the casing, and an inwardly directed tongue formed on said member and adapted to engage said shutter to lock it in instantaneous and time exposure positions, the release of said shutter being effected by the depression of said finger piece.

2. In a photographic camera comprising a circular casing closed at the top and bottom, and having a portion projecting from its periphery to contain a lens, the combination of a liner for the interior of said casing consisting of a single strip of resilient material, said liner being spaced apart from the inner wall of the casing to form a guideway for the movement of a shutter, a shutter, a spring for actuating said shutter, and means forming time and instantaneous stops formed integral with said liner, said means embodying a finger piece projecting through said casing, and an inwardly directed tongue adapted for engagement with apertures formed in said shutter.

THOMAS WALLACE.